United States Patent Office 3,849,469
Patented Nov. 19, 1974

3,849,469
PREPARATION OF α-OXIMINONITRILES
Manfred Jautelat, Leverkusen, Germany, assignor to Bayer Aktiengesellschaft, Leverkusen, Germany
No Drawing. Filed Aug. 29, 1973, Ser. No. 392,831
Claims priority, application Germany, Sept. 6, 1972, P 22 43 629.9
Int. Cl. C07c 121/02
U.S. Cl. 260—464
9 Claims

ABSTRACT OF THE DISCLOSURE

A process for the preparation of an α-oximinonitrile of the formula

(I)

in which R is an alkyl, alkenyl or alkynyl radical of 2-12 carbon atoms, a halogenoalkyl, cyanoalkyl, nitroalkyl or hydroxyalkyl radical of 1-8 carbon atoms, or a cycloalkyl radical, comprising reacting an α-iminonitrile of the formula

(II)

in which $R^1$ is one of the radicals specified for R, or is an aryl or a heterocyclic radical, with an acid-addition salt of hydroxylamine in the presence of a diluent at a temperature of about 20° to 150° C. Those compounds wherein R is tertiary alkyl or a cycloalkyl radical are new.

---

The present invention relates to an unobvious process for the preparation of certain aliphatic α-oximinonitriles, which can be used as intermediates for the synthesis of pesticidally active compounds, and to certain of these α-oximinonitriles that are new.

It has been disclosed that aromatic α-oximinonitriles are obtained when aromatically substituted acetonitriles such as benzyl cyanide are reacted with nitrosylating agents (see Houben-Weyl, Methoden der Organischen Chemie (Methods of Organic Chemistry), G. Thieme Verlag, Stuttgart, volume X/4, page 30). However, this process suffers from the disadvantage that it is only suitable for the synthesis of aromatic α-oximinonitriles since only aryl radicals adequately activate the methylene group of the substituted acetonitrile for oxime formation; alkyl radicals do not suffice for the purpose.

It has also been disclosed that simple aliphatic α-oximinonitriles are obtained by oxidation of α-hydroxylaminonitriles with p-benzoquinone (see J. Org. Chem. 25, 1471–1473 (1960)). However, this process suffers from the disadvantage that the yields, which are 41–64%, are only moderate. Furthermore, it is not possible to obtain α-hydroxylaminonitriles from all aldehydes and ketones, since the oximes are preferentially produced (see J. Org. Chem. 23, 964–967 (1958)).

The present invention provides a process for the preparation of an aliphatic α-oximinonitrile of the general formula

(I)

in which R is an alkyl, alkenyl or alkynyl radical of 2-12 carbon atoms, a halogenoalkyl, cyanoalkyl, nitroalkyl or hydroxyalkyl radical of 1–8 carbon atoms, or a cycloalkyl radical, in which an iminonitrile of the general formula

(II)

in which $R^1$ is one of the radicals specified for R or is an aryl or a heterocyclic radical, is reacted with (III) an acid-addition salt of hydroxylamine, $H_2N$—OH, in the presence of a diluent (which term herein includes a solvent), at a temperature of about 20° to 150° C.

Preferably R is straight-chain or branched alkyl with 2 to 8 carbon atoms (especially tertiary alkyl with 4–7 carbon atoms), straight-chain or branched alkenyl with 2 to 5 carbon atoms (especially with 2 or 3 carbon atoms), straight-chain or branched alkynyl with 3 to 6 carbon atoms, halogenoalkyl with 1 to 4 carbon atoms and 1 to 3 halogen atoms (especially chlorine or fluorine), cyanoalkyl, nitroalkyl or hydroxyalkyl with, in each case, 1 to 4 carbon atoms, or monocyclic, bicyclic or polycyclic alkyl with 3 to 10 carbon atoms and which may be optionally substituted by alkyl with 1 to 3 carbon atoms (especially by methyl), cyclohexyl and adamantyl being preferred examples; and $R^1$ is straight-chain or branched alkyl with 1 to 7 carbon atoms, cycloalkyl with 5 to 8 carbon atoms, a six-membered heterocyclic structure which contains one or more hetero-atoms (such as N and/or O) in the ring (for example, morpholinyl), or aryl with 6 to 10 carbon atoms (especially phenyl). The novel compounds may exist in syn- and/or anti-form.

It must be described as distinctly surprising that α-oximinonitriles of the formula (I) are obtained in the process of the invention in good yields since it would have been expected, from the state of the art, that hydroxylamine would react the α-iminonitriles of the formula (II) as with the corresponding acyl cyanides, with addition to the nitrile group, to give oximinoamidoximes (see Houben-Weyl, Methoden der Organischen Chemie (Methods of Organic Chemistry), G. Thieme Verlag, Stuttgart, volume X/4, pages 85 and 209). In fact, no addition to the nitrile group takes place and instead the imino group is substituted, with formation of the α-oximinonitriles of the formula (I).

The process according to the invention has a number of advantages. Thus, the α-oximinonitriles can be obtained in good yields (74–94%) after short reaction times. Since the α-iminonitriles can be prepared from imido-halides in a "one-pot process," they are easily obtainable starting materials.

This preparative process is the subject of German Patent Application P 22 21 771.6 corresponding essentially to U.S. application Ser. No. 356,531 filed May 2, 1973. According to that disclosure the α-iminonitriles are obtained by reaction of the imide-halides with cyanides or hydrogen cyanide.

If 2-phenylimino-3,3-dimethylbutyronitrile and hydroxylamine hydrochloride are used as starting materials, the course of the reaction can be represented by the following equation:

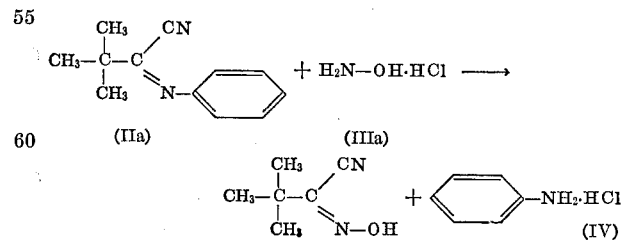

The following may be mentioned as examples of the α-iminonitriles (II) which can be used according to the invention:

2-tert.-butylimino-3,3-dimethylbutyronitrile,
2-phenylimino-3,3-dimethylbutyronitrile,
2-cyclohexylimino-3,3-dimethylbutyronitrile,
2-isopropylimino-3,3-dimethylbutyronitrile, 2-n-butylimino-3,3-dimethylbutyronitrile,
2-phenylimino-3,3-dimethylvaleronitrile,
α-phenylimino-β-methyl-hexahydrobenzylnitrile,
α-phenylimino-adamantyl-1-acetonitrile,
2-phenylimino-3-methylbutyronitrile,
2-phenylimino-3-chloro-3-methylbutyronitrile,
2-phenyliminovaleronitrile,
2-phenylimino-3,3-dichloropropionitrile and
2-cyclohexylimino-3-methylene-butyronitrile.

The α-iminonitriles of the formula (II) which are used as starting materials are in part known (see Chemische Berichte *102*, 1447–1448 (1969) or J. Org. Chem. *34*, 4040, 4046 (1969)). A number of them, however, are the subject of the above-mentioned German and corresponding U.S. patent applications.

Referring to the acid-addition salts of hydroxylamine that may be used in the process of this invention, the acid moiety is preferably hydrogen chloride, hydrogen bromide, nitric acid, sulfuric acid, phosphoric acid, acetic acid, oxalic acid or a sulfonic acid. The following may be mentioned as examples of the hydroxylamine acid-addition salts which can be used according to the invention: hydroxylammonium chloride, hydroxylammonium sulfate and hydroxylammonium acetate.

The hydroxylamine acid-addition salts used as starting materials are generally known.

Possible diluents in the process according to the invention are all inert solvents. Preferred solvents are alcohols, such as ethanol or butanol, dimethylsulfoxide, dimethylformamide and dioxane.

The reaction temperatures can be varied over a fairly wide range. In general, the reaction is carried out at temperatures between 20° and 150° C., preferably at between 40° and 120° C.

In carrying out the process according to the invention, the starting compounds of the formulas (II) and (III) are preferably employed in a molar ratio of 1:1. Deviations from this molar ratio produce no significant advantage.

The working-up may be effected in the usual manner by taking up the reaction mixture, after completion of the reaction, in a solvent which is immiscible with water and extracting with water and with dilute mineral acid. After drying the solution, the solvent is removed, whereupon the reaction product in most cases is left in a pure form. The products thus obtained are in most cases colorless crystalline compounds which can be distilled *in vacuo* without decomposition.

A number of the α-oximinonitriles obtainable according to the invention are new. In these compounds, R in the formula (I) is tertiary alkyl or a cycloalkyl radical, e.g. an optionally substituted monocyclic, bicyclic or polycyclic alkyl radical, especially tertiary butyl, 2-methylbutyl-2 and 1-methylcyclohexyl.

The process of this invention is illustrated in the following preparative Examples.

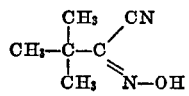

30.4 g. (0.2 mole) of 2-isopropylimino-3,3-dimethylbutyronitrile and 14 g. (0.2 mole) of hydroxylamine hydrochloride in 100 ml. of ethanol were heated under reflux for 2 hours. After concentrating the solution, the residue was diluted with methylene chloride and repeatedly extracted by shaking with dilute hydrochloric acid and water. The solution was dried and evaporated to dryness *in vacuo*, whereupon 23.6 g. (0.187 mole; 94%) of 2-oximino-3,3-dimethyl-butyronitrile of melting point 70° were left.

When 2-phenylimino-3,3-dimethylbutyronitrile was employed instead of the 2-isopropylimino derivative in this reaction, the same reaction product was obtained.

Example 2

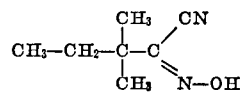

72 g. (0.36 mole) of 2-phenylimino-3,3-dimethylvaleronitrile and 25 g. (0.36 mole) of hydroxylamine hydrochloride in 300 ml. of ethanol were heated under reflux. After working-up in accordance with the procedure of Example 1, the liquid reaction product was distilled. At the boiling point of 66–67° C./0.06 mm. Hg, 42.35 g. (0.302 mole; 84%) of 2-oximino-3,3-dimethylvaleronitrile were obtained.

Example 3

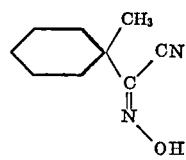

181 g. (0.8 mole) of α-phenylimino-β-methyl-hexahydrobenzylnitrile 55.6 g. (0.8 mole) of hydroxylamine hydrochloride in 600 ml. of ethanol were heated under reflux for 3 hours. The customary working-up with distillation (boiling point 94–96° C./0.02 mm. Hg) yielded 99.1 g. (0.596 mole; 74%) of α-oximino-β-methyl-hexahydrobenzylnitrile which solidified on standing (melting point 62–64°).

The α-oximinonitriles obtainable according to the invention are useful as intermediates for the preparation of new fungicidal and bactericidal N-sulfenylated oxime-carbamates. The preparation and use of these active compounds is the subject of another patent application.

The N-sulfenylated oxime-carbamates may be obtained, for example, by reacting the α-oximinonitriles according to the formula (I) with N-sulfenylated carbamic acid fluorides in the presence of diluents and acid-binding agents. For example, by the process of Example 3 α-phenylimino-phenylacetonitrile and hydroxylamine hydrochloride yield α - oximinophenylacetonitrile. Reaction of N-(fluorodichloromethylthio) - N - phenyl-carbamic acid fluoride with α-oximinophenylacetonitrile in dioxane at about 30° C. in the presence of triethylamine yields N-(fluorodichloromethylthio) - N - phenylcarbamic acid iminophenylacetonitrile. This compound thus obtained for example possesses a good activity against *Fusicladium dendriticum* Fuckel when a 0.0062% suspension in 95/4.7/0.3 water/acetone/alkyl aryl polyglycol ether is sprayed on young apple seedlings infected with the fungus. The other α-oximinonitriles may be similarly reacted and the products are also fungicidally active.

It will be appreciated that the instant specification and examples are set forth by way of illustration and not limitation, and that various modifications and changes may be made without departing from the spirit and scope of the present invention.

What is claimed is:

1. A process for the preparation of an α-oximinonitrile of the formula

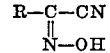

in which R is an alkyl, alkenyl or alkynyl radical of 2–12 carbon atoms, a halogenoalkyl, cyanoalkyl, nitroalkyl or hydroxyalkyl radical of 1–8 carbon atoms, or a cycloalkyl radical, comprising reacting an α-iminonitrile of the formula

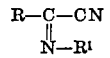

in which R¹ is one of the radicals specified for R, or is an aryl or a heterocyclic radical, with an acid-addition salt of hydroxylamine in the presence of an inert diluent at a temperature of about 20° to 150° C.

2. A process according to claim 1, in which R is alkyl of 2 to 8 carbon atoms; alkenyl of 2 to 5 carbon atoms; alkynyl of 3 to 6 carbon atoms; halogenoalkyl of 1 to 4 carbon atoms and 1 to 3 halogen atoms; cyanoalkyl, nitroalkyl or hydroxyalkyl of 1 to 4 carbon atoms; or monocyclic, bicyclic or polycyclic alkyl of 3 to 10 carbon atoms optionally substituted by alkyl of 1 to 3 carbon atoms.

3. A process according to claim 1, in which $R^1$ is alkyl of 1 to 7 carbon atoms, cycloalkyl of 5 to 8 carbon atoms, a six-membered heterocyclic radical or aryl of 6 to 10 carbon atoms.

4. A process according to claim 1 in which the reaction is effected in the presence of a polar solvent.

5. A process according to claim 4, in which the solvent is a lower alkanol, dimethylsulfoxide, dimethylformamide or dioxane.

6. A process according to claim 1, in which the reaction is effected at between 40° and 120° C.

7. A process according to claim 1, in which the α-iminonitrile and the acid-addition salt are employed in substantially equimolar amounts.

8. A process according to claim 1, in which the acid moiety of the acid-addition salt of hydroxylamine is hydrogen chloride, hydrogen bromide, nitric acid, sulfuric acid, phosphoric acid, acetic acid, oxalic acid or a sulfonic acid.

9. A process according to claim 2, in which $R^1$ is alkyl of 1 to 7 carbon atoms, cycloalkyl of 5 to 8 carbon atoms, a six-membered heterocyclic radical or aryl of 6 to 10 carbon atoms, in which the acid moiety of the acid-addition salt of hydroxylamine is hydrogen chloride, hydrogen bromide, nitric acid, sulfuric acid, phosphoric acid, acetic acid, oxalic acid or a sulfonic acid, the α-iminonitrile and the acid-addition salt being employed in substantially equimolar amounts, the reaction being effected at about 40 to 120° C. in a solvent selected from the group consisting of a lower alkanol, dimethylsulfoxide, dimethylformamide and dioxane.

References Cited
UNITED STATES PATENTS

| | | | |
|---|---|---|---|
| 3,215,709 | 11/1965 | Logothetis | 260—464 X |
| 3,673,236 | 6/1972 | Brechbuhler et al. | 260—465.5 R |

OTHER REFERENCES

Kissenger et al.; J. Org. Chem., 25 (1960), pp. 1471–1473.

JOSEPH P. BRUST, Primary Examiner

U.S. Cl. X.R.

260—465.5 R